(12) United States Patent
Weber

(10) Patent No.: US 11,047,667 B2
(45) Date of Patent: Jun. 29, 2021

(54) MEASURING TAPE CLIP

(71) Applicant: Glenn Weber, Northridge, CA (US)

(72) Inventor: Glenn Weber, Northridge, CA (US)

(*) Notice: Subject to any disclaimer, the term of this patent is extended or adjusted under 35 U.S.C. 154(b) by 174 days.

(21) Appl. No.: 16/457,053

(22) Filed: Jun. 28, 2019

(65) Prior Publication Data
US 2020/0408500 A1    Dec. 31, 2020

(51) Int. Cl.
*G01B 3/1084* (2020.01)
*G01B 3/1089* (2020.01)

(52) U.S. Cl.
CPC .......... *G01B 3/1084* (2013.01); *G01B 3/1089* (2020.01)

(58) Field of Classification Search
CPC .. G01B 3/1084; G01B 3/1089; G01B 3/1071; G01B 2003/1079
USPC .......................................... 33/770, 484, 486
See application file for complete search history.

(56) References Cited

U.S. PATENT DOCUMENTS

| | | | | |
|---|---|---|---|---|
| 457,077 A * | 8/1891 | Dahl | ................. | B43L 7/00 33/486 |
| 1,713,891 A * | 5/1929 | Dooley | ................. | G01B 3/02 33/770 |
| 1,988,095 A * | 1/1935 | Stockman | ............ | G01B 3/1061 33/27.03 |
| 2,026,768 A * | 1/1936 | Aronson | ................. | B43L 7/005 33/27.03 |
| 2,396,877 A * | 3/1946 | Peterson | .............. | G01B 3/1061 33/770 |
| 2,591,333 A * | 4/1952 | Bellmer | ................ | G01B 3/1061 33/770 |
| 3,242,578 A * | 3/1966 | Moll | ....................... | G01C 15/00 33/340 |
| 3,289,305 A * | 12/1966 | Norton | ................ | G01B 3/1084 33/759 |
| 3,744,134 A * | 7/1973 | Zima, Jr. | .............. | G01B 3/1071 33/768 |
| 4,507,869 A * | 4/1985 | Stude | ..................... | B43L 7/005 33/42 |
| 6,094,833 A * | 8/2000 | Medley, Jr. | ............. | G01C 9/28 33/770 |
| 6,463,666 B1 * | 10/2002 | Szumer | .................... | G01B 3/02 33/451 |
| 7,900,370 B1 * | 3/2011 | Treige | ..................... | G01B 3/20 33/770 |

(Continued)

FOREIGN PATENT DOCUMENTS

KR    100820351 B1 *    4/2008  ............ G01B 3/563

*Primary Examiner* — Christopher W Fulton
(74) *Attorney, Agent, or Firm* — Edwin Tarver

(57) ABSTRACT

A tape clip apparatus for resiliently and removably installing on a measuring tape, includes a main body portion hingedly connected to an engaging portion. The engaging portion is sized to substantially overlay the main body portion. The main body portion has a window including an indicator, and at least one leg having an engaging panel. The engaging portion includes a triangular cut-out tab which is aligned with the indicator in the window in the main body portion. The engaging portion also includes a cradle for holding the measuring tape, and a resilient clip for engaging the engaging panel. The cradle holds the measuring tape such that the measuring tape is visible through the window, and the triangular cut-out tab extends away from the main body portion and the engaging portion when they are folded together.

20 Claims, 4 Drawing Sheets

(56) References Cited

U.S. PATENT DOCUMENTS

| | | | |
|---|---|---|---|
| 8,522,447 B1* | 9/2013 | Novotny | G01C 15/105 |
| | | | 33/770 |
| 2002/0178597 A1* | 12/2002 | Todd | E04F 21/00 |
| | | | 33/484 |
| 2006/0288599 A1* | 12/2006 | Hajianpour | G01B 3/10 |
| | | | 33/755 |
| 2012/0073155 A1* | 3/2012 | Mabey | G01B 3/1005 |
| | | | 33/770 |
| 2016/0223311 A1* | 8/2016 | Reyes | G01B 3/1084 |
| 2017/0261301 A1* | 9/2017 | DeMartinis | G01B 3/1084 |
| 2017/0322007 A1* | 11/2017 | Stewart | G01B 3/1084 |

* cited by examiner

MEASURING TAPE CLIP

BACKGROUND

The present apparatus generally relates to measurements and measurement marking apparatus. More specifically, the present apparatus relates to a place holder for resiliently marking and releasing a marker on a measuring tape.

Measuring tapes are well known in the art, and typically comprise an elongated planar tape with distance-based gradations or measurements, typically broken down into a series of measurements for different units such as inches, feet, etc. An important aspect of measuring tapes currently known in the art is that they are spoolable, typically being wound around a central hub when not in use. The hub is typically spring-loaded, such that the measuring tape is biased to return to the hub when released unless locked in position. Alternatively, some measuring tapes for longer distances use no spring loaded hub, and rely on a hand crank to retract the tape measure.

In general, automatically retracting tape measures are made of a metal ribbon having a lateral arc. This imparts some rigidity to the tape, but allows it to spool onto the central hub. Other, non-metal, tapes typically have no rigidity. To hold a tape in position when extended from a hub, the tape typically comprises an anchor at the end for catching on a surface. The anchor may be as simple as an L-shaped tab, or a more complex structure. A problem persists in that tension between the anchor and hub is usually the only mechanism for preserving the location or position of a tape measure once measurements have been made. In a location where the tape cannot be sufficiently anchored, the tape is subject to being moved and thereby destroying a particular measurement.

Another problem exists in that the tape measure provides no inherent means of marking a location of a measurement. A user must either mark a measured object or surface at the desired measurement, which is not always practical, since the object may be moved or otherwise incapable of marking. Alternatively, a user can mark the tape itself, however this is not desirable since markings are difficult to make (in the case of a metal or similar tape) and erasing the mark on a tape can be time consuming and laborious. Also, making and erasing marks on a tape risks causing damage to the tape.

Hence, what is needed is an apparatus that allows the location on a measuring tape to be temporarily marked and preserved without the limitations of existing techniques.

SUMMARY

A primary embodiment of a tape clip apparatus for resiliently and removably installing on a measuring tape, includes a main body portion having a flush side, the flush side being planar in profile. An engaging portion having a facing side, is foldably connected to the main body portion. The facing side is configured to foldably overlay the flush side of the main body portion. The engaging portion further comprises a triangular cut-out tab configured to extend away from the main body portion and the engaging portion when they are folded together.

The main body portion includes a window, which is aligned with the triangular cut-out tab. The facing side having at least one cradle extending therefrom, the at least one cradle configured to removably hold the measuring tape therein. The facing side also includes at least one resilient clip extending from it, and the main body portion includes at least one engaging panel for engaging the one or more resilient clips. The measuring tape is held by the at least one cradle between the engaging portion and the main body portion with the at least one clip engaging the at least one engaging panel, and wherein the measuring is visible through the window.

The engaging portion is preferably connected to the main body portion by a living hinge, and the facing side is configured to fully cover the flush side. The main body portion may include a first leg and a second leg, each bearing one of the at least one engaging panels. Preferably, the first leg and a second leg extend away from the measuring tape.

The triangular cut-out tab preferably includes a point in alignment with an indicia in the window, and the engaging portion may include a triangular cut-out opposite the triangular cut-out tab. In such instances, the triangular cut-out tab and the triangular cut-out are preferably in alignment with an indicia in the window. The facing side may include two cradles, and may also have two resilient clips and the main body portion with two engaging panels for engaging the resilient clips.

In a second embodiment, the tape clip is an apparatus for resiliently and removably installing on a measuring tape, including a main body portion having a flush side, the flush side being planar in profile. An engaging portion includes a facing side, a hinge connecting the main body portion and the engaging portion, with the facing side configured to overlay the flush side of the main body portion;

the main body portion comprising a window with a pointed top, a first leg having a first engaging panel and a second leg having a second engaging panel. The engaging portion includes a first triangular window, with the first triangular window pointed to align with the pointed top.

The facing side includes a cradle for holding the measuring tape, with the facing side also including a first resilient clip for engaging the first engaging panel, and a second resilient clip for engaging the second engaging panel. The cradle preferably holds the measuring tape, such that the measuring tape is visible through the window with a pointed top, and through the first triangular window of the engaging portion, when the first and second resilient clip engage first and second engaging panel, respectively.

In the second embodiment, the engaging portion may be connected to the main body portion by a living hinge. The facing side is preferably configured to fully cover the flush side, and the window with a pointed top may also include an indicator, the indicator aligned with the pointed top. The engaging portion may also include a third window, the third window being triangular and having a point aligned with the first triangular window. The facing side may also include two cradles.

In a third embodiment, the tape clip apparatus for resiliently and removably installing on a measuring tape, includes a main body portion hingedly connected to an engaging portion. The engaging portion is sized to substantially overlay the main body portion, and the main body portion includes a window having an indicator. The main body includes a leg having an engaging panel. The engaging portion includes a triangular cut-out tab aligned with an indicator in a window in the main body portion. The engaging portion includes a cradle for holding the measuring tape, and the engaging portion includes a resilient clip for engaging the engaging panel. The cradle holds the measuring tape such that the measuring tape is visible through the window, and wherein the triangular cut-out tab extends away from the main body portion and the engaging portion when they are folded together.

Preferably, in the third embodiment apparatus, the engaging portion is connected to the main body portion by a living hinge. The engaging portion may also include a triangular cut-out opposite the triangular cut-out tab, with the triangular cut-out tab and the triangular cut-out in alignment with an indicia in the window. In some instances, the engaging portion may include two cradles, and the engaging portion may include two resilient clips, with the main body portion comprising two engaging panels for engaging the two resilient clips.

DETAILED DESCRIPTION

Figure 1:
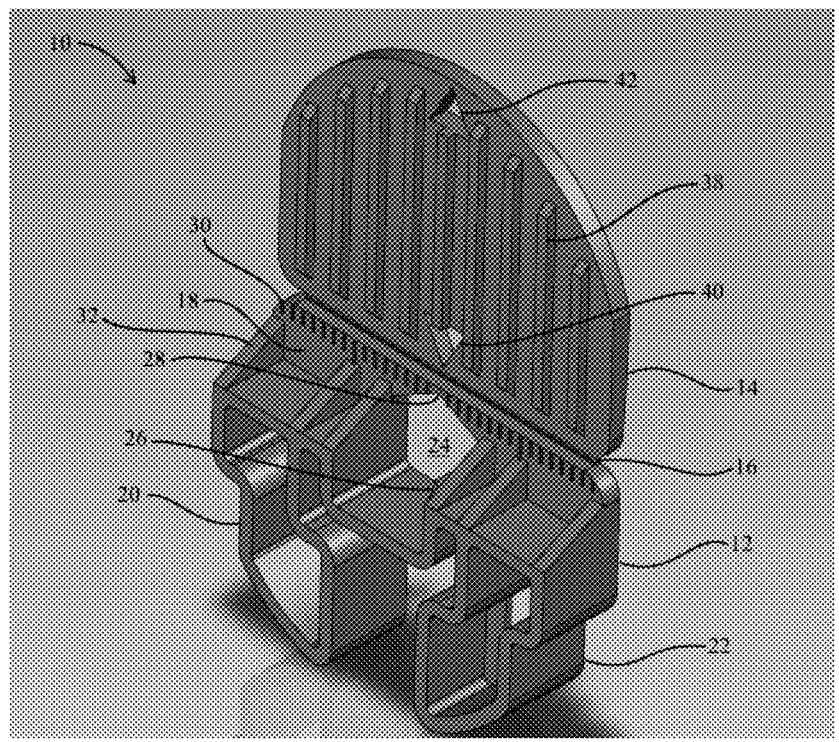
FIG. 1 illustrates a perspective view of a tape clip for engaging a measuring tape.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Referring to FIGS. 1-5, a tape clip 10 for installation on and resilient engagement of a measuring tape 100 (FIG. 6) comprises a main body portion 12 and an engaging portion 14. The engaging portion is foldably connected to the body, preferably by a living hinge 16, although any other connection method allowing the engaging portion 14 to fold over against the body 12 is contemplated. The body portion 12 comprises a flush side 13, planar in profile, a top section 18 which engages the measuring tape 100, and a first leg 20 and a second leg 22 that depend from the top section. The top section 18, first leg 20 and second leg 22 are preferably constructed as a frame having a predetermined thickness sufficient for resiliently retaining the shape of the tape clip 10 as it is manipulated onto the measuring tape 100, removed from the measuring tape 100, and as it undergoes mechanical stress when used in heavy construction environments. In one preferred embodiment, the tape clip 10 is comprised of an injection molded heavy plastic or plastic-like material.

Figure 2:
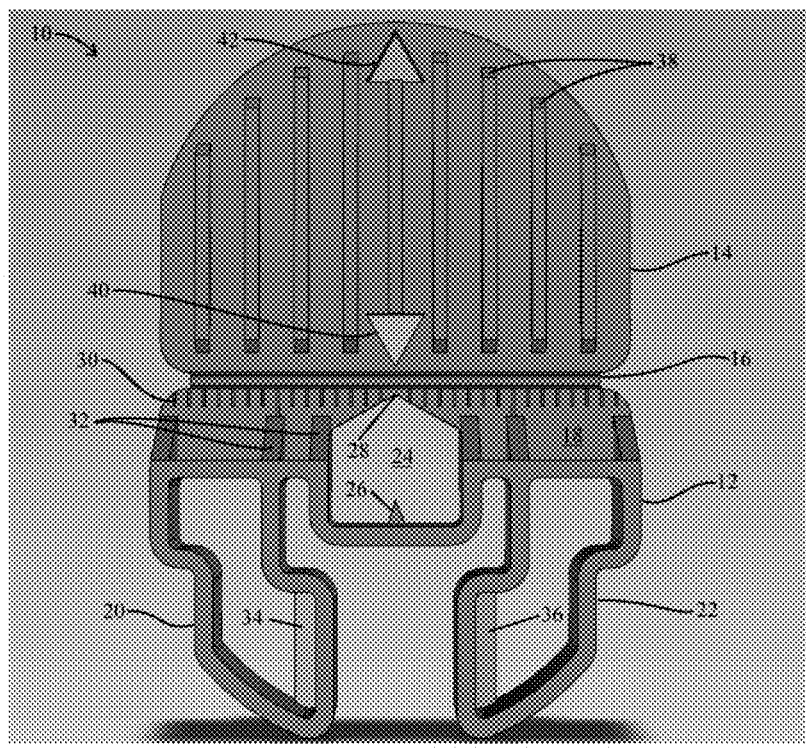
FIG. 2 illustrates a front elevation view of the tape clip.

Referring to FIG. 2, the body portion 12 includes a window 24 is provided centrally along the top section 18. The window 24 allows a user to view measurements 102 (FIG. 6) on the measuring tape 100 when installed on the tape clip. The window 24 is preferably of sufficient size for easily identifying the measurements 102, and may also include an indicator 26 to help accurately locate the tape measure 100 in the tape clip 10. As shown in the illustrated embodiment, the window 24 is also preferably shaped to have a pointed top 28, so that the tape clip 10 can be precisely located on the tape measure 100. A series of measurement lines 30 are preferably located along the top of the top section 18, to allow users to identify measurements 102 on the measuring tape 100 that are close to the location of the pointed top 28, but obscured by the tape clip 10, for example, half an inch from the location of the pointed top 28.

To preserve the structural integrity of the tape clip 10 between the top section 18 and the first leg 20 and second leg 22, a series of first support ribs 32 preferably connect the tops of the first leg 20 and second leg 22 and the top section 18. In the illustrated embodiment, the positioning of the first support ribs 32 preferably coincides with the location of the framing constituting the first leg 20 and the second leg 22. Inside the framing of the first leg 20 and the second leg 22, a first engaging panel 34 and a second engaging panel 36 are positioned to capture the engaging portion 14 when it is folded down over the measuring tape 100 and against the body portion 12. The first engaging panel 34 and the second engaging panel 36 may be beveled to assist with capturing and releasing the engaging portion 14. The frame-like first leg 20 and second leg 22, and the first support ribs 32 preferably extend outward from the front of the body portion 12 as illustrated, thus allowing the engaging portion 14 to lie flush against the body portion 12.

The engaging portion 14 preferably comprises a substantially planar member, which is connected to the body portion 12 by living hinge 16. On the front side of the tape clip 10, the engaging portion 14 may include a series of second support ribs 38 extending vertically. In addition to supporting the structural integrity of the engaging portion 14, the second support ribs 38 provide a gripping surface for grasping and manipulating the tape clip 10. The engaging portion also preferably has a first triangular window 40, which overlaps the window 24 on the body portion 12. With a point of the triangular window 40 matching the location of the pointed top 28. A second triangular window 42 is provided opposite the first triangular window 40, preferably having a point aligned with a point of the first triangular window, thus allowing a user to align the tape clip 10 (and attached measuring tape 100) relative to other structures. Both the first triangular window 40 and the second triangular window 44 are preferably cut-outs formed in the engaging portion 14 during or after manufacture. As illustrated, the engaging portion 14 is sized and shaped to be at least partially in peripheral contour with the body portion 12.

Figures 3, 4:
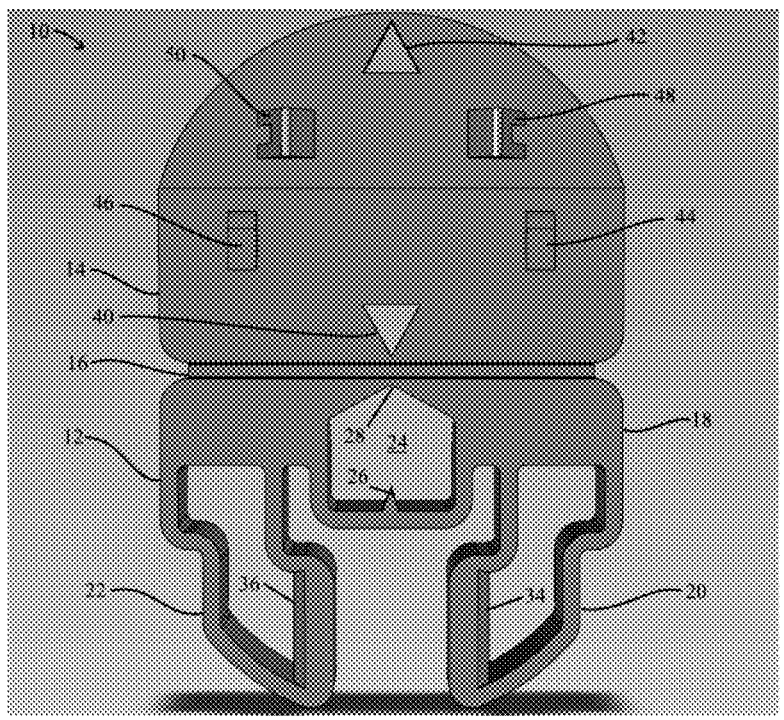
FIG. 3 illustrates a rear elevation view of the tape clip.
FIG. 4 illustrates a top plan view of the tape clip.

Referring to FIG. 3, on the rear side of the tape clip 10, both the body portion 12 and the engaging portion 14 present a substantially smooth surface. The engaging portion 14 may include a first cradle 44 and a second cradle 46 into which the measuring tape 100 is installed, and which hold the measuring tape 100 close to and level relative to the living hinge 16 when the engaging portion 14 is folded over the body portion 12. However, in preferred embodiments, the first cradle 44 and the second cradle 46 are omitted so that the tape clip 10 can hold measuring tapes having a variety of thicknesses. The engaging portion 14 also includes a first resilient clip 48 and a second resilient clip 50 for engaging the first engaging panel 34 and the second engaging panel 36 when the engaging portion 14 is folded over the body portion 12. The first triangular window 40 allows a user to see a small portion of the measuring tape 100 opposite the window 24, and indicates where the pointed top 28 is when viewing the tape clip 10 from the side opposite the window 24.

FIG. 4 shows a top view of the tape clip 10 including the manner in which the first cradle 44 and the second cradle 46, and the first resilient clip 48 and second resilient clip 50 stand off the back of the engaging portion 14. Also shown are the second support ribs 38 of the engaging portion 14, and the first support ribs 32 of the body portion 12.

Figure 5:
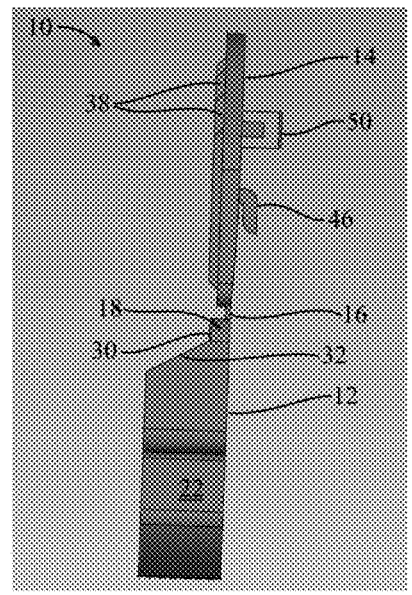
FIG. 5 illustrates a side elevation view of the tap clip.

Referring to FIG. 5, the body portion 12 and the engaging portion 14 are arranged and connected to the living hinge 16 such that the back side of the tape clip 10 is flush. This arrangement allows the tape measure 100 to be slid into the first cradle 44 and the second cradle 46, and the body portion 12 and engaging portion 14 folded together, such that the tape measure 100 is sandwiched between them, with the tape measure still in the first cradle 44 and the second cradle 46. The first cradle 44 and the second cradle 46, along with the first resilient clip 48 and the second resilient clip 50 will fold into the first leg 20 and the second leg 22, respectively, of the body portion 12, when the engaging portion 14 and body portion 12 are folded together.

Figure 6:
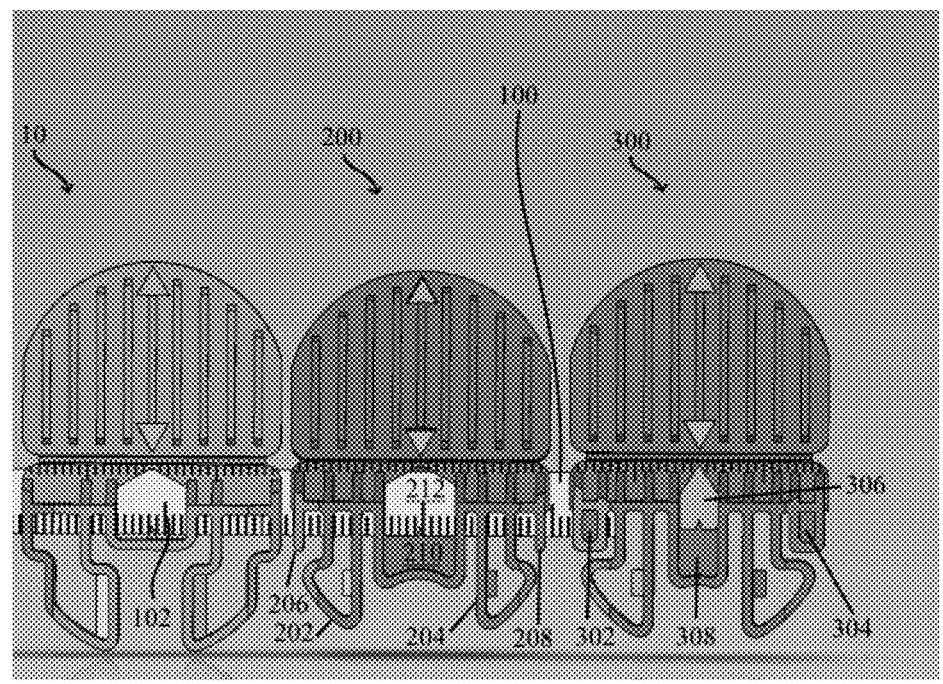
FIG. 6 illustrates various alternative embodiments of the tape clip installed on a measuring tape in an open configuration.

Referring to FIG. 6, the primary embodiment tape clip 10, along with a second embodiment tape clip 200 and a third embodiment tape clip 300, with the measuring tape 100 having measurements 102. In all embodiments the major features are identical, however, the second embodiment tape clip 200 has a slightly differently shaped first leg 202 and second leg 204, with a first guide 206 and a second guide 208 proximal the first leg 202 and second leg 204, respectively. Also, a window panel 210 is provided below the window 212 of the tape clip 200. The third embodiment tape clip 300 includes a wider first guide 302 and a wider second guide 304, but has a narrower window 306, and a correspondingly narrower window panel 308. Other than these minor variations, each of the embodiments functions in substantially the same manner as the primary embodiment tape clip 10.

Figure 7:
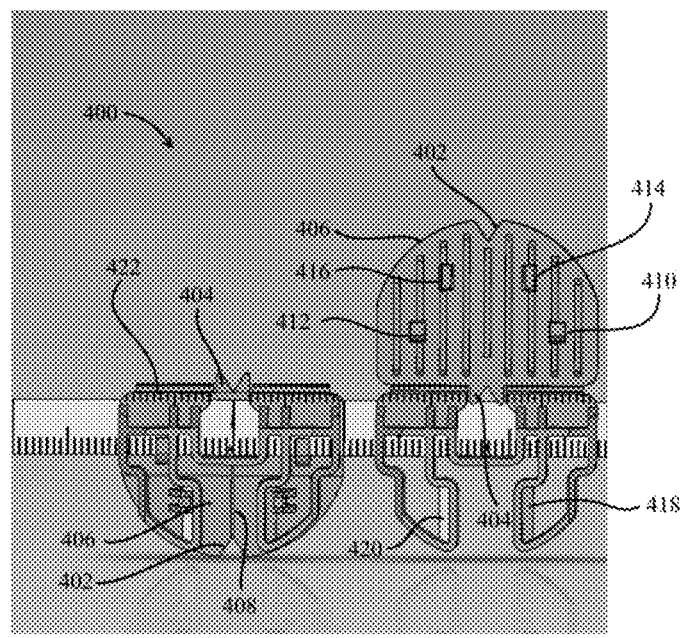
FIG. 7 illustrates the tape clip in an open configuration installed on a measuring tape and the tape clip in a closed configuration installed on a measuring tape.
Figure 8:
FIG. 8 illustrates a plurality of tape clips secured at intervals along a measuring tape in a typical installation.

Referring to FIG. 7, a fourth embodiment tape clip 400 is shown in a partially installed position and in a fully installed position on the measuring tape 100. In the fourth embodiment tape clip 400, the first triangular window 40 and the second triangular window have been replaced by a triangular cut out 402, and a triangular tab 404, which indicate the position of the tape clip 400 on the measuring tape 100. Additionally, on the back side of the engaging portion 406 an alignment line 408 has been provided between the triangular cut out 402 and the triangular tab 404 to further promote accurate placement of the tape clip 400 on the measuring tape 100. In a preferred embodiment, the tape clip 400 includes graduated measurements 422 on either side of the triangular tab 404 to help align the tape clip 400 with a measuring tape Referring to FIG. 8, a plurality of tape clips, in any of the aforementioned embodiments (10, 200, 300, 400) may be employed by securing them at intervals along a measuring tape.

In order to employ an individual tape clip (10, 200, 300, 400), a user first obtains the measuring tape 100 and, by viewing its measurements 102 selects an appropriate location for the tape clip 10. The user then opens the tape clip 10 if necessary, or if otherwise in an open configuration, places the measuring tape 100 in the first cradle and the second cradle, ensuring that the selected measurement 102 aligns with the pointed top 28 of the window 24 and/or the indicator 26 in the event the measurements 102 are at the bottom of the window 24. The engaging portion 14 is then manipulated down over the measuring tape 100 along the living hinge 16 until the first resilient clip 48 and the second resilient clip 50 have engaged the first engaging panel 34 and the second engaging panel 36, respectively. With the tape clip 10 securely affixed to the measuring tape 100, one or more additional tape clips 10 may be placed on the measuring tape as desired. Once measurements are complete, to remove the one or more tape clips 10, the user simply urges the engaging portion 14 away from the body portion 12 until the first resilient clip 48 and the second resilient clip 50 disengage from the first engaging panel 34 and the second engaging panel 36. The one or more tape clips 10 can then be stored for later use as desired.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A tape clip apparatus for resiliently and removably installing on a measuring tape, the apparatus comprising:
   a main body portion having a flush side, the flush side being planar in profile;
   an engaging portion having a facing side, the engaging portion foldably connected to the main body portion with the facing side configured to foldably overlay the flush side of the main body portion;
   the engaging portion further comprising a triangular cut-out tab configured to extend away from the main body portion and engaging portion when folded together;
   the main body portion having a window aligned with the triangular cut-out tab;
   the facing side having at least one cradle extending therefrom, the at least one cradle configured to removably hold the measuring tape therein;
   the facing side further comprising at least one resilient clip extending therefrom;
   the main body portion further comprising at least one engaging panel for engaging the at least one resilient clip; and
   wherein the measuring tape is held by the at least one cradle between the engaging portion and the main body portion with the at least one clip engaging the at least one engaging panel, and wherein the measuring is visible through the window.

2. The apparatus of claim 1 wherein the engaging portion is connected to the main body portion by a living hinge.

3. The apparatus of claim 1 wherein the facing side is configured to fully cover the flush side.

4. The apparatus of claim 1 wherein the main body portion comprises a first leg and a second leg, each bearing one of the at least one engaging panels.

5. The apparatus of claim 1 further comprising a first leg and a second leg wherein the first leg and the second leg extend away from the measuring tape.

6. The apparatus of claim 1 wherein the triangular cut-out tab comprises a point in alignment with an indicia in the window.

7. The apparatus of claim 1 wherein the engaging portion further comprises a triangular cut-out opposite the triangular cut-out tab, the triangular cut-out tab and the triangular cut-out in alignment with an indicia in the window.

8. The apparatus of claim 1 wherein the facing side comprises two cradles.

9. The apparatus of claim 1 wherein the facing side comprises two resilient clips and the main body portion comprises two engaging panels for engaging the resilient clips.

10. A tape clip apparatus for resiliently and removably installing on a measuring tape, the apparatus comprising:
 a main body portion having a flush side, the flush side being planar in profile;
 engaging portion having a facing side;
 a hinge connecting the main body portion and the engaging portion, with the facing side configured to overlay the flush side of the main body portion;
 the main body portion comprising a window with a pointed top, a first leg having a first engaging panel and a second leg having a second engaging panel;
 the engaging portion having a first triangular window, the first triangular window pointed to align with the pointed top;
 the facing side comprising a cradle for holding the measuring tape;
 the facing side further comprising a first resilient clip for engaging the first engaging panel, and a second resilient clip for engaging the second engaging panel; and
 wherein the cradle holds the measuring tape such that the measuring tape is visible through the window with a pointed top, and through the first triangular window of the engaging portion, when the first and second resilient clip engage first and second engaging panel, respectively.

11. The apparatus of claim 10 wherein the engaging portion is connected to the main body portion by a living hinge.

12. The apparatus of claim 10 wherein the facing side is configured to fully cover the flush side.

13. The apparatus of claim 10 wherein the window with a pointed top further comprises an indicator, the indicator aligned with the pointed top.

14. The apparatus of claim 10 wherein the engaging portion further comprises a third window, the third window being triangular and having a point aligned with the first triangular window.

15. The apparatus of claim 10 wherein the facing side comprises two cradles.

16. A tape clip apparatus for resiliently and removably installing on a measuring tape, the apparatus comprising:
 a main body portion hingedly connected to an engaging portion;
 the engaging portion sized to substantially overlay the main body portion;
 the main body portion comprising a window having an indicator, and a leg having an engaging panel;
 the engaging portion having a triangular cut-out tab aligned with the indicator in the window in the main body portion;
 the engaging portion comprising a cradle for holding the measuring tape;
 the engaging portion further comprising a resilient clip for engaging the engaging panel; and
 wherein the cradle holds the measuring tape such that the measuring tape is visible through the window, and wherein the triangular cut-out tab extends away from the main body portion and the engaging portion when they are folded together.

17. The apparatus of claim 16 wherein the engaging portion is connected to the main body portion by a living hinge.

18. The apparatus of claim 16 wherein the engaging portion further comprises a triangular cut-out opposite the triangular cut-out tab, the triangular cut-out tab and the triangular cut-out in alignment with an indicia in the window.

19. The apparatus of claim 16 wherein the engaging portion comprises two cradles.

20. The apparatus of claim 16 wherein the engaging portion comprises two resilient clips and the main body portion comprises two engaging panels for engaging the two resilient clips.

* * * * *